United States Patent
Cardoso et al.

(10) Patent No.: US 9,619,890 B2
(45) Date of Patent: Apr. 11, 2017

(54) SYSTEM AND METHOD FOR ANNOTATING IMAGES BY PROPAGATING INFORMATION

(71) Applicant: UCL BUSINESS PLC, London (GB)

(72) Inventors: Manuel Jorge Cardoso, London (GB); Sebastien Ourselin, London (GB); Robin Wolz, London (GB); Daniel Rueckert, London (GB)

(73) Assignee: UCL BUSINESS PLC, London (GB)

( * ) Notice: Subject to any disclaimer, the term of this patent is extended or adjusted under 35 U.S.C. 154(b) by 0 days.

(21) Appl. No.: 14/430,990

(22) PCT Filed: Sep. 27, 2013

(86) PCT No.: PCT/GB2013/052525
§ 371 (c)(1),
(2) Date: Mar. 25, 2015

(87) PCT Pub. No.: WO2014/049368
PCT Pub. Date: Apr. 3, 2014

(65) Prior Publication Data
US 2015/0262372 A1    Sep. 17, 2015

Related U.S. Application Data

(60) Provisional application No. 61/721,640, filed on Nov. 2, 2012.

(30) Foreign Application Priority Data

Sep. 28, 2012    (GB) .................................. 1217372.0

(51) Int. Cl.
*G06K 9/00*    (2006.01)
*G06T 7/00*    (2017.01)
*G06K 9/62*    (2006.01)

(52) U.S. Cl.
CPC .......... *G06T 7/0083* (2013.01); *G06K 9/6215* (2013.01); *G06T 7/0093* (2013.01);
(Continued)

(58) Field of Classification Search
None
See application file for complete search history.

(56) References Cited

U.S. PATENT DOCUMENTS

2012/0281900 A1*  11/2012  Rueckert ................ G06K 9/468
                                                                    382/131

FOREIGN PATENT DOCUMENTS

GB    WO 2011/039515    *  4/2011  ............... G06T 7/00
WO         2011039515 A1        4/2011

OTHER PUBLICATIONS

Isgum et al ("Multi-Atlas-Based Segmentation with Local Decision Fusion—Application to Cardiac and Aortic Segmentation in CT scans", 2008).*

(Continued)

*Primary Examiner* — Avinash Yentrapati
(74) *Attorney, Agent, or Firm* — Park, Vaughan, Fleming & Dowler LLP

(57) ABSTRACT

One embodiment of the invention provides a computer-implemented method of annotating images in a data set comprising a first set of images which initially have annotations and a second set of images which initially do not have annotations. The method comprises the steps of determining spatial correspondences for all pairs of images in the data set, wherein each spatial correspondence represents a mapping of a location in a first image to a corresponding location in a second image. For each mapping, the method further comprises calculating a connection strength between the location in the first image and the corresponding location in the second image. The method further comprises itera- (Continued)

tively propagating information across images in the data set using the connection strengths of the mappings as weights for propagating the information, augmented by an estimate of propagation accuracy, wherein the propagated information is used to provide annotations to images which do not initially have annotations, and wherein each iteration performs a propagation across all images in the data set.

21 Claims, 7 Drawing Sheets

(52) U.S. Cl.
CPC .. *G06T 7/0097* (2013.01); *G06T 2207/10072* (2013.01); *G06T 2207/10088* (2013.01); *G06T 2207/20036* (2013.01); *G06T 2207/20072* (2013.01); *G06T 2207/20128* (2013.01); *G06T 2207/20216* (2013.01); *G06T 2207/30016* (2013.01)

(56) References Cited

OTHER PUBLICATIONS

Lotjonen et al ("Fast and robust multi-atlas segmentation of brain magnetic resonance images", 2009).*

Hamm et al ("GRAM: A framework for geodesic registration on anatomical manifolds", 2010).*

Isgum I et al: "Multi-Atlas-Base Segmentation With Local Decision Fusiona Application to Cardiac and Aortic Segmentation in CT Scans", IEEE Transactions on Medical Imaging, IEEE Service Center, Piscataway, NJ, US, pp. 1000-1010, XP011249667, ISSN: 0278-0062 abstract section II-B.

Hongzhi Wang et al: "Optimal Wights for Multi-atlas label Fusion" In: "Field Programmable Logic and Application", Jan. 1, 2011 (Jan. 1, 2011), Springer Berlin Heidelberg, Berlin, Heidelberg, XP055093729, ISSN: 0302-9743 ISBN: 978-3-54-045234-8 vol. 6801, pp. 73-84, DOI: 10.1007/978-3-642-22092-0_7, section 2.

Lotjonen J MP; Wolz R; Koikkalainen J R; Thurfjell L; Waldemar G; Soinnen H; Rueckert D, et al. : "Fast and robust multi-atlas segmentation of brain magnetic resonance images", Neuroimage, Academic Press, Orlando, FL, US vol. 49, No. 3, Feb. 1, 2010 (Feb. 1, 2010), pp. 2352-2365, XP026981594, ISSN: 1053-8119 [retrieved on Oct. 24, 2009] mp. 2356 par. "Non-image-based selection methods".

Wolz R ; Aljabar P; Hajnal J V ; Hammers A; Rueckert D, et al. ; "LEAP: Learning embedding for atlas propagation", Neuroimage, Academic Press, Orlando, FL, US vol. 49, No. 2, Jan. 15, 2010 (Jan. 15, 2010, pp. 1316-1325, XP026796260, ISSN: 1053-8119 [retreived on Oct. 6, 2009] cited in the application abstract Section "Materials and methods" in p. 1317-1320 p. 1323 right-hand column.

Hamm J et al. : "GRAM: A framwork for geodesic registration on anatomical manifolds", Medical Image Analysis, Oxford, GB, vol. 14, No. 5, Oct. 1, 2010 (Oct. 1, 2010), pp. 633-642, XP027153800, ISSN: 1361-8415 [retreived on Jun. 8, 2010] cited in the application abstract section 2.1.

* cited by examiner

SYSTEM AND METHOD FOR ANNOTATING IMAGES BY PROPAGATING INFORMATION

FIELD OF THE INVENTION

The present invention relates to a system and method of annotating images by propagating information from a first set of images which initially have annotations to a second set of images which initially do not have annotations.

BACKGROUND OF THE INVENTION

Databases of images are used in a wide variety of applications, such as medical imaging, security analysis of luggage, satellite observations of earth, and so on. In the particular context of medical imaging, the images may be in two-dimensional or three-dimensional form, and may be acquired through various modalities, such as MRI, X-ray, and so on. These images can then be used for a range of purposes, including detecting and monitory disease or abnormalities, preparing and performing interventions, such as surgery, and so on.

An image may be processed to perform segmentation and/or annotation. For example, the segmentation may determine which parts of the image relate to a particular organ (or organs), while annotation might label certain features that are visible in the image. In neuroimaging, pathological classification techniques have mostly relied on such features extracted from MRI images, either using voxel-based features [16,17] or features estimated from segmented structures or regions-of-interest (ROI) known to be affected by certain pathologies, like gray matter density [18], volume [19] or shape [20]. Despite remarkable success of the above methods, there are shortcomings resulting from the inherent complexity of the problem. Voxel-based methods rely on the ability to map all the pathological and non-pathological subjects onto a common space of comparison, called a groupwise space. This correspondence is a highly ill-posed problem which cannot be uniquely determined by intensity-based image attributes and where an exact anatomical correspondence may not exist at all due to anatomical variability across subjects. For example, it may not be possible to perfectly map subjects with two different cortical folding patterns through a biologically meaningful transformation. Thus, large morphological differences between an individual and the groupwise space can result in a significant amount of residual information that the transformation does not capture [21]. This residual mismatch between subjects acts as a morphological confound [22], reducing the statistical power of voxel-based techniques. On the other side, ROI-based techniques do not use groupwise spaces for comparison and thus do not have the same mapping limitation. However, they require selecting and accurately segmenting the ROI, a process that can be time-consuming, prone to error, and requiring a priori hypotheses on a relevant ROI. Moreover, ROI-based techniques effectively perform feature reduction, discarding potentially useful features and resulting in lower performance for pathology classification [23].

Recently, a third class of techniques has emerged based on the concept of label propagation and fusion. This class of techniques typically uses a set of anatomical images (atlas) with an associated voxel-wise label map. Using image registration techniques, one can propagate the atlases and their corresponding label maps to a new unseen image. After alignment, the most similar atlases and labels (according to a similarity metric) are then used in the fusion step in order to obtain an optimal label map for the new unseen image. Typically, the previously described label maps represent a structural brain parcellation [24,25], although this framework can be extended to any type of information, i.e. probabilistic segmentations, population atlases and pathological classifications. Recent work by [26] explored the use of a label fusion framework in order to pathologically grade anatomical structures. Despite the many limitations of this framework, a high degree of accuracy for "AD vs. control" classification was obtained, namely a success rate of 90%, which is competitive with state-of-art machine learning approaches.

However, structural and anatomical information is only available for a small subset of image data that is available to researchers in various image databases. Likewise, clinical data (e.g. information about the subject of the image and his/her medical condition) is also rarely available. Unfortunately, providing this additional information, such as manual parcelations and/or segmentations, locations of anatomical landmarks, tissue priors, pathological classification of the subject, and so on, requires large amounts of human interaction, usually from a skilled professional. It is therefore not feasible in practice to provide full information about the images in many databases through manual interaction.

Attempts have therefore been made in the context of medical imaging to extrapolate and propagate this supplementary information across morphologically dissimilar image datasets in a coherent and error-free manner. In neuro-image analysis, one example of such information propagation is multi-atlas segmentation. Many researchers have shown that propagating structural parcelations from multiple sources, by mapping them to new unseen data using image registration and then fusing the candidate parcelations, provides a good estimation of the true underlying parcelation [1, 2]. However, in the case of a limited and morphologically clustered source of information, like the 30 young control subjects with an associated parcelation of 83 key brain areas provided by Hammers et al. [3], structural parcelation propagation can be problematic. As these parcelations are defined only on young controls with normal anatomy, it is non-trivial to map this information directly to morphologically dissimilar and pathological subjects [4, 5] without introducing large errors.

More recently, Wolz et al. [6] introduced the LEAP approach (learning embeddings for atlas propagation) for brain segmentation (see also WO2011/039515), in particular, for segmentation propagation of the hippocampus. In LEAP, a low-dimensional representation of the data is used to find morphologically similar datasets. This morphological similarity is then used to gradually diffuse the segmentation of the brain from the 30 Hammers atlases [3] to pathological Alzheimer's diseased patients via morphologically similar intermediate datasets, greatly increasing the segmentation accuracy. Accordingly, the available segmentations are gradually propagated and transferred between morphologically disparate subjects via multiple morphologically intermediate images. However, this method has still some limitations regarding its computational complexity, its restriction to global morphometric characterization and the limited set of features it can use. In addition, as the region-of-interest size increases, the morphological embedding becomes less localised, potentially resulting in a decrease in performance. A similar framework, but for geodesic image registration, was also introduced by Hamm et al. [7] with the GRAM (geodesic registration on anatomical manifolds) method. This family of step-wise propagation algorithms will become increasingly relevant as the availability of larger and larger image databases continues to drive the need for automatically propagating segmentation, annotations, and other such additional information.

SUMMARY OF THE INVENTION

The invention is defined in the appended claims.

One embodiment provides a computer-implemented method of annotating images in a data set comprising a first set of images which initially have annotations and a second set of images which initially do not have annotations. The method comprises the steps of determining spatial correspondences for all pairs of images in the data set, wherein each spatial correspondence represents a mapping of a location in a first image to a corresponding location in a second image; for each mapping, calculating a connection strength between the location in the first image and the corresponding location in the second image; and iteratively propagating information across images in the data set using the connection strengths of the mappings as weights for propagating the information, augmented by an estimate of propagation accuracy. The propagated information is used to provide annotations to images which do not initially have annotations.

Each iteration performs a propagation across all images in the data set. In particular, an attempt is made to propagrate information from all images with annotations (either initially provided or since determined by a previous iteration) to all images which did not initially have annotations (even if they have now been annotated by a previous iteration). Note however that some images which do not yet have annotations may be too far from those images that do have annotations to receive propagated information at the current iteration—such images will then receive propagated information at a subsequent iteration, as the annotations diffuse through the data set.

Note that the information being propagated may represent any form of data, labeling, etc associated with the image, whether a segmentation, parcellation, labeling of a feature, identification of a potential pathological condition, a vector field, and so on.

In an embodiment, determining the connection strength includes defining a pairwise measure of similarity between one or more features in a pair of images. The pairwise measure of similarity may be based on intensity similarity between the images and/or a characteristic of deformation between a pair of images. The similarity may also be based on clinical metadata associated with the images, including age, gender, pathological status, cognitive or biological testing (as examples), thereby providing a very flexible and powerful technique for assessing connection strength. It will be appreciated that in some implementations, the connection strength may be determined from multiple such factors.

In an embodiment, the pairwise measure of similarity is calculated locally on a restricted portion of the images (rather than globally across whole images), so that the connection strength may be spatially variant across the pair of images. This determination of a local connection strength further improves the flexibility and power of the technique.

In an embodiment, the propagation step is performed by weighted averaging, classifier fusion or kernel regression. A very wide range of information may be propagated, including labels, intensities, displacement fields, probabilities, pathological status, statistics, vectors, or a combination of these. (Other implementations may propagate other parameters in addition to or instead of those listed above).

In an embodiment, the connection strength and/or the information propagation step is augmented by an intensity-based refinement operation. This enables the propagation of other types of information between subjects, such as pathological status.

In an embodiment, the connection strength used in the information propagation step is augmented by an estimate of propagation accuracy. For example, the estimate of propagation accuracy may be based on the number of iterations before an image is annotated—hence images that are initially annotated (or annotated by an early iteration) have more weight for propagating information than images which are only annotated by a relatively late iteration.

In some embodiments, the weighted sum involves weightings that are based on a geodesic distance, such that images in the second set which are closer to images in the first set are regarded as having a higher accuracy. For example, the weighting may be based on the sum of (i) the smallest value of a neighbour's geodesic distance, and (ii) the pairwise distance for all neighbouring nodes. Such a geodesic distance represents the distance between a given position in an image in the second set and the closest source of information for that position in a separate image from the first set. In other embodiments, the weightings may be based just on the pairwise distance for all neighbouring nodes (which are simpler to calculate, although they do not always give such accurate propagations).

The approach described herein may be utilized for a wide variety of images, including two-dimensional or three-dimensional images, monochromatic, colour, etc. Furthermore, the images may have been acquired via a number of different imaging modalities, such as MRI, X-ray, optical, ultrasound, PET, SPECT, and so on. The images may have been obtained for any of a number of purposes, such as medical images, security images, and so on.

The approach described herein therefore helps to slowly diffuse information from its source to all the other images in a database (data set) in an unbiased manner. In particular, information may be propagated along a geodesic path of local data embeddings. These local embeddings may be represented as a voxel-wise implicit undirected graph, with a heat kernel based information reconstruction weight that uses both local image similarity and local image morphology as a metric for controlling the propagation. This approach not only allows information (structural parcellations, tissue atlases, etc.) to be transferred between anatomically disparate images with improved accuracy, but also allows estimation of geodesic distance maps that represent the local degree of confidence and extrapolation of the propagated information. Overall, as the reconstruction weights are both symmetric and inverse consistent, the framework can be used to propagate any information from any subject (or group of subjects) to every other subject in a dataset using an unbiased information flow.

Such an approach allows for homogenising the availability of manually generated information in large image databases, especially with regard to medical imaging. Due to the time-consuming nature of manually segmenting, parcellating and localising landmarks in medical images, these sources of information tend to be scarce and limited to small, and sometimes morphologically similar, subsets of data. The approach described herein helps to propagate these sources of information to morphologically dissimilar images by diffusing and mapping the information through intermediate steps. The spatially variant data embedding uses local morphology and intensity similarity between images to diffuse information only between locally similar images. Such an approach therefore enables any form of information (e.g. manual segmentations, structural parcelations, tissue atlases, pathological findings, etc.) to be propagated from a set of images in a database to a new unseen set of images in a robust and accurate manner.

In particular, information can be propagated to morphologically very distinct images by diffusing and mapping the information through intermediate steps, thus increasing both the robustness and accuracy. A spatially variant data embedding is utilised which takes into account both the local morphology and intensity similarity between images to diffuse the information only between locally similar images, thus avoiding large extrapolation errors. An iterative annealing process may be used to solve the information diffusion problem, ensuring the manifold is non-linear and fully connected. Such a framework also allows the characterization of image abnormality and information uncertainty, enabling the identification of atypical shapes and appearances, which then correlates with pathological findings.

Such an approach may be used, for example, for biomarker development by providing volumetric measurements and rates of change (e.g. structure atrophy, image signal changes) of anatomical structures, locating and delimiting regions-of-interest for functional image analysis (PET/SPECT uptake), disease classification by looking at the degree of image abnormality and at the pathological classification of the most similar images in the database.

A wide variety of information may be propagated, including segmentations and annotations. In some embodiments, vector fields may be propagated. Such a vector field might represent, for example, the direction and magnitude of movement (such as the shrinkage of certain brain components as the result of Alzheimer's disease).

The approach described herein may be implemented as a computer program running on general purpose hardware, such as one or more computer processors. In some implementations, at least part of the computer program may run on specialised hardware particularly suited for image processing, such as a GPU (graphics processing unit). In some implementations, the approach described herein may be implemented at least in part using dedicated hardware (rather than software). In some implementations, the functionality described herein may be implemented by a stand-alone computing system. In other implementations, the functionality may be provided by (integrated into) an imaging system, for example, an MRI scanner, an X-ray imaging system, and so on.

DETAILED DESCRIPTION

Methods

We first introduce the mathematical framework and the undirected graph for geodesic information flow, followed by the introduction of a distance metric that describes both image intensity similarity and morphological similarity between images. Finally, after building the graph embedding, the geodesic information propagation step is presented for two types of information: numerical and label attributes.

The Implicit Local Data Embedding

Let a set Y with R images be the full set of observed grey-valued anatomical data with the a-th image of this set denoted by $Y_a$. Each image $Y_a$ is a vector of size $N_a$, with its i-th voxel denoted by $Y_{a,i}$.

In order to embed the observed data within a manifold, one normally starts by finding a distance between each pair of images. This distance provides insights about the global similarity between the images, and subsequently, about the manifold structure of the data. Theoretically, this global embedding assumes that one can represent the space spanned by the full data in a low dimensional space. However, due to the complexity of medical image data, the dimensions of the manifold can lack interpretability and usefulness. For example, Gerber et al.[8] explored the manifold structure of the space of brain images and concluded that the first dimension of the manifold represents global ventricular expansion due to disease and ageing, while the meaning of the second dimension is described as "less obvious".

Ideally, one would like to capture the local manifold structure of the brain on a spatially constrained neighbourhood and not the global brain morphology. With one manifold representation per voxel, one would be able to describe the local brain morphology and similarity as a measure of distance between two mapped locations, and respective neighbourhoods, in two different images. However, due to computational and memory requirements, this problem is generally untractable. As an example, only to store a pairwise distance matrix for one single image at every voxel and assuming a set of 120 neighbouring images with average size $200^3$, one would need approximately 400 GB of memory. Furthermore, the memory requirements grow in proportion to $R^2$, where R is the number of datasets (images). Thus, one cannot have an explicit representation of the manifold at the voxel level.

Figure 1:
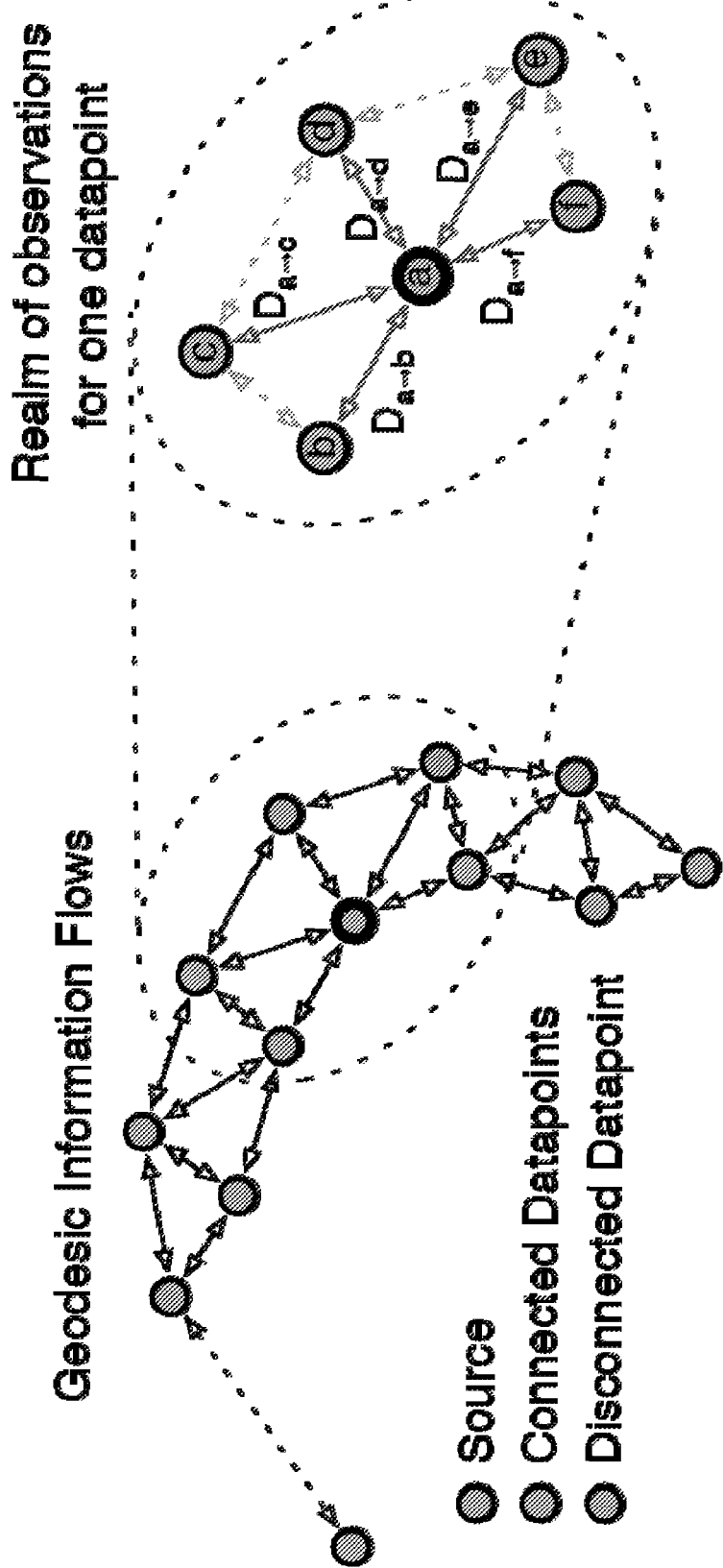
FIG. 1 illustrates: (i) (left) the use of an implicit manifold for information propagation in accordance with an embodiment of the invention, and (ii) (right) the connections between data points on the implicit manifold in accordance with an embodiment of the invention.

As described herein, instead of constructing an explicit representation of the manifold, we implicitly represent the manifold through the local neighbourhood graph of each data point. This greatly reduces both computational complexity and memory requirements, making the problem tractable and linearly scalable with the number of datasets R in the database. Let D be a set of distance matrices, with the a-th matrix of this set denoted by $D_a$. Here, $D_a$ is an $N_a \times (R-1)$ matrix describing the distance between the image a and each one of the remaining (R-1) images at every sample position i. More specifically, $D_{a \to b}(i)$ contains the distance between the i-th sample of image $Y_a$ and its corresponding sample in image $Y_b$. We now introduce a threshold $d_t$ over these distances. By doing so, one can now build an undirected graph where the neighbourhood of each data-point is restricted only to the data-points with $D_{a \to b}(i) < d_t$. Note that the graph is undirected only if the distances are a semi-metric (subadditivity is not required). FIG. 1 (left) illustrates this implicit manifold with the neighbourhood defined as all the data points within a certain distance. Note that if the manifold is sparse, some data points might be disconnected.

As described herein, we do not explicitly represent the full graph; rather, in order to solve the information diffusion problem at a given location, we just keep track of the graph neighbourhood at that specific location. This is illustrated in FIG. 1 (right), which shows a diagram representing the observed and unobserved connections (in blue and green respectively) and distances from the standpoint of the data point a. The realm of observations (the blue connections) from the data point a in bold is limited by its direct neighbouring nodes with distances below $d_t$.

Under this undirected graph assumption, a heat kernel decay function $W_{a \to b}(i)$ is then used to diffuse the information [9]. This kernel is defined as:

$$W_{a \to b}(i) = \begin{cases} e^{-\frac{D_{a \to b}(i)}{t}} & D_{a \to b}(i) < d_t \\ 0 & \text{else} \end{cases} \quad \text{Eq. (1)}$$

with t being a heat kernel temperature that will determine the speed and the distance the information can diffuse. In the present case, we set $d_t = t$, meaning that the choice of t will determine both the maximum distance travelled by the information and the amount of information diffusion that occurs at each iteration.

The Distance Metric

The heat kernel decay function is based on the assumption that one can calculate a distance between two nodes in the graph. This distance should be at least a semi-metric, respecting both the coincidence and separation axioms and symmetry. In a medical imaging framework, and more specifically in neuroimaging, the local distance between images should take into account both local morphology and local image similarity. To achieve this goal, Gerber et al. [8] propose the use of coordinate transformations as a distance metric that informs about the object's morphology. These coordinate transformations map an image $Y_a$ to an image $Y_b$ by finding the optimal transformation $T_{a \to b}$ that minimises some cost function. In order to be a semi-metric, this coordinate transformation has to be symmetric, inverse-consistent and diffeomorphic. As described herein, we use a symmetric variant of a non-rigid free-form registration algorithm as described in [10]. Under the symmetry and diffeomorphism constraints, the transformation $T_{a \to b} = T^{-1}_{b \to a}$ and $T_{a \to b} \circ T_{b \to a} = \text{Id}$, with $T_{-1}$ being the inverse of the transformation, $\circ$ being the composition operator and Id the identity transformation.

In order to remove the smoothly varying local affine component of the transformation that characterises the global anatomical shape differences, the low frequency component of the transformation is removed. From the remaining high-frequency version of the transformation, one can then find the displacement field $F_{a \to b}$ that describes how much a point i in $Y_a$ has to move in order to match the corresponding point j in $Y_b$.

Although the displacement field determined as above describes the morphological differences between the brains, we also combine it with an intensity similarity metric in order to assess the local similarity between the images after transformation [11]. This similarity term is used to characterise both the local differences in tissue appearance due to pathology (e.g. damaged white matter in dementia) and also any possible errors in local registration. The local similarity between an image $Y_a$ and an image $Y_b$ transformed by $T_{b \to a}$, denoted by $L_{a \to b}$, can be calculated as the local sum of squared differences (LSSD) between the intensity in these images, using a cubic B-spline kernel as a local smoothing function. We combine the two metrics together by setting $D_a(i, b) = \alpha L_{a \to b}(i) + (1-\alpha) F_{a \to b}(i)$, with $\alpha$ being a relative weight, so that both a low displacement and a low LSSD are necessary to obtain a low distance $D_a(i, b)$ between images. In the approached described herein, $\alpha = 0.5$, but other implementations may use different values, depending on the particular circumstances. For example, the intensity images Y may be z-scored before estimating L in order to balance the influence of L and F in the metric.

The distance metric can also be extended to accommodate metadata for the images. For example, one or more metadata parameters may be available for an image, such as the identity of the subject, the age/gender/ethnicity of the subject, pathological information, imaging modality, and so on. This can be helpful where, for example, morphology changes with age, so that for a pair of images, the respective ages of the subjects provides one indication of how similar the respective morphologies are likely to be. As another example, propagation might be restricted or prohibited from an image representing one pathology to an image representing a very different pathology. It will be appreciated that multiple factors may be combined, as appropriate, in order to determine the distance metric.

Geodesic Distance Estimation

When diffusing information through the implicit graph, Equation (1) assumes that the distance between the nodes, and thus the quality of the available information, is only dependent on their pairwise distance $D_{a \to b}(i)$. However, nodes that are closer to the source of information should generally have more accurate information (e.g. segmentation), as the extrapolation error will be lower. Accordingly, in some embodiments, this accuracy metric is also used for information flow processes.

In order to do this, we introduce a vector $G_a(i)$ to represent a geodesic distance between position i in image a and the closest source of information in a separate image, namely image b. Let K represent a set of all images that are sources of information, i.e. they may have pre-defined augmentative information. Assuming that the Euclidean distance $G_a(i) = 0 \forall a \in K$, then the geodesic distance at position $G_b(i)$ can be calculated as the shortest path from all $a \in K$ following the implicit graph structure.

In the geodesic information flow framework, due to the implicit nature of the graph, one does not have access to the full graph structure. Thus, one cannot directly estimate $G_a(i)$, rather, $G_a(i)$ can be obtained by iteratively solving at every voxel of every image $a \notin K$ by $$G_a(i) = \operatorname{argmin}(G_b(T_{a \to b}(i)) + D_{a \to b}(i)) \text{ for } b \in D_{a \to b}(i) < d_t \quad \text{(Eq 1A)}$$

In other words, the geodesic distance at the voxel (position) i and image a is equal to the smallest value of the neighbour's geodesic distance, $G_b(T_{a \to b}(i))$, plus the pairwise distance, $D_{a \to b}(i)$ for all neighbouring nodes. Note that for all $a \notin K$, the geodesic distance is initially set to $G_a(i) = +\infty$.

We can reformulate Equation (1) having regard to Equation 1A to give:

$$W_{a \to b}(i) = \begin{cases} e^{-\frac{(G_b(T_{a \to b}(i)) + D_{a \to b}(i))}{t}} & D_{a \to b}(i) < d_t \\ 0 & \text{else} \end{cases} \quad \text{Eq. (1B)}$$

If i is an unsolved or disconnected node, then $W_{a \to b}(i)=0$, as $e^{-\infty}=0$. Similarly, a source node i will have weight dependent on $D_{a \to b}(i)$ only. As higher proximity to the source of information results in higher weights, this approach to reconstruct the information will propagate the information faster than if G=0, analogous to a fast marching wavefront propagation.

Note that Equation 1B provides an alternative formulation for the heat kernel decay function (W), compared with the formulation of Equation 1. Either formulation may be adopted for annotating images as described herein, although Equation 1B may provide more accurate (and quicker) annotations in some circumstances.

Geodesic Information Flows

The two previous sections have defined the neighbourhood graph and the distance metric. This section makes use of the graph structure to introduce the concept of propagating information between neighbouring nodes of the graph.

Let I be a set of vectors, with the a-th vector of this set denoted by $I_a$. Each vector $I_a$ has its i-th element denoted by $I_{a,i}$, representing the associated information at location i for image $Y_a$. Assuming that the information to be propagated is only available in a subset of images within the full database, only some of the vectors $I_a$ will be defined. Now, let an indicator vector $K_a$, indexed by $K_{a,i}$, characterise the status of the information at location $I_{a,i}$. Here, $K_{a,i}$ is set to 2 if $I_{a,i}$ is a source of information, is set to 1 if the information has diffused and reached the location $I_{a,j}$, or is set to 0 if the information does not exist at location $I_{a,i}$. As the realm of observations at each spatial location is limited by its closest neighbours, the data flow is approximated by a normalised weighted sum of the information available within the neighbourhood. Thus:

$$I_{a,i} = \frac{\Sigma_{\forall b \in K_{b,j} > 0} W_{a \to b}(j) I_{b,j}}{\Sigma_{\forall b \in K_{b,j} > 0} W_{a \to b}(j)} \quad \text{Eq. (2)}$$

with j being the spatially transformed coordinate i into the space of image $I_b$, mapped using the previously described transformation. The information flow is thus governed by the heat kernel-derived weights $W_{a \to b}(i)$. If the set $b \in (K_b, j>0)$ is not empty, the information in $I_{b,j}$ can then be propagated to $I_{a,j}$. In this case, $K_{a,i}$ is set to 1, else $K_{a,i}$ is set to 0. Note that Equation (2) is only valid for floating point data propagation like a probabilistic atlas. The same equation can be re-formulated in a weighted label fusion scheme by making $I_{a,i}$ equal to $p(I_{a,i}, l)$, representing the probability that location i in image a has label l, and by making $I_{b,j}$ equal to $p(I_{b,j}, l)$, representing the probability that location j has label l in image b. Equation (2) is solved iteratively for all samples where $K_{a,i}<2$, until all are marked as solved, i.e. $K_{a,i}=1$. The number of times $I_{a,i}$ could not be solved, because $K_{b,j}>0 \forall b$ is an empty set, represents the necessary number of steps through the graph's geodesic path to transport the information from its source. This number of steps can be seen as a distance that represents the amount of extrapolation of information, where a larger extrapolation should result in lower propagation accuracy.

Finally, because the temperature t determines the neighbourhood size and consequently the existence of a connection from every information source to all the targets, the geodesic information flow is solved multiple times for several values of t. In one implementation, this temperature t is stepped from 5 down to 1 with decrements of 0.5. In a similar fashion to an annealing process, the information at the lowest possible temperature is kept as the answer, as the distance travelled by each extrapolation step is the lowest.

In Equation (2), the indicator vector $K_b$ serves to track the images to which information must be propagated. However, it can also be considered as indicative of the estimated accuracy of the information (annotation) within $I_b$. Thus in the particular implementation above, K=2 indicates an image with original information (highly accurate), while K=1 indicates an image with propagated information (less accurate). In other implementations, K may be set to other values to give a more nuanced estimate of the accuracy of propagated information. For example, if N is the number of iterations before an image receives propagated information (as mentioned above), then K might be set to 1/N (or some other function that decreases as N increases). Another possibility is that K reflects the weighted accuracy of its direct neighbours, so if an image that receives information from images which themselves are considered to have relatively accurate information, then the receiving image is likewise considered to have relatively accurate information.

$$I_{a,i} = \frac{\Sigma_{\forall b} K_{b,j} W_{a \to b}(j) I_{b,j}}{\Sigma_{\forall b} K_{b,j} W_{a \to b}(j)} \quad \text{Eq. (3)}$$

Equation (3) is a modification of Equation (2) where, without loss of generality, $K_{b,j}$ is considered to be a value between 0 and 1 to represent the accuracy at location $I_{a,i}$, where 0 indicates that no information is available (yet) for this image, 1 indicates that the image was initially annotated at that location, and intermediate values indicate the estimated accuracy of information that has been propagated so far to this image location. Accordingly, the information propagation of Equation (3) is not only weighted by connection strength (W), but also by the estimated accuracy of the propagating information (K)—i.e. propagation from image B to image A (for a given pair of locations) is stronger if (i) the connection strength (W) between the locations in B and A is relatively high, and (ii) if the estimated accuracy (K) of the information at the location in image B is relatively high.

Validation

Figure 2:
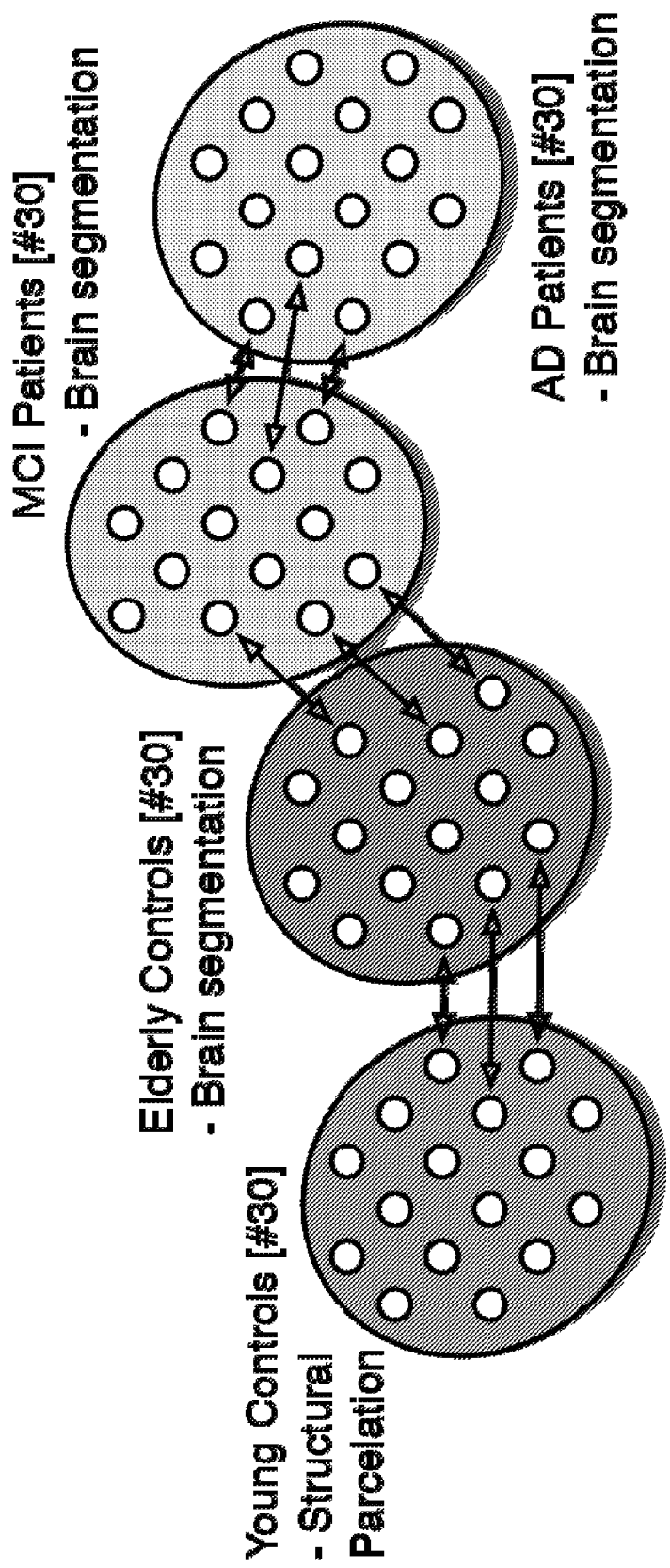
FIG. 2 illustrates various (known) image data sets used in testing a method in accordance with an embodiment of the invention.
Figure 3:
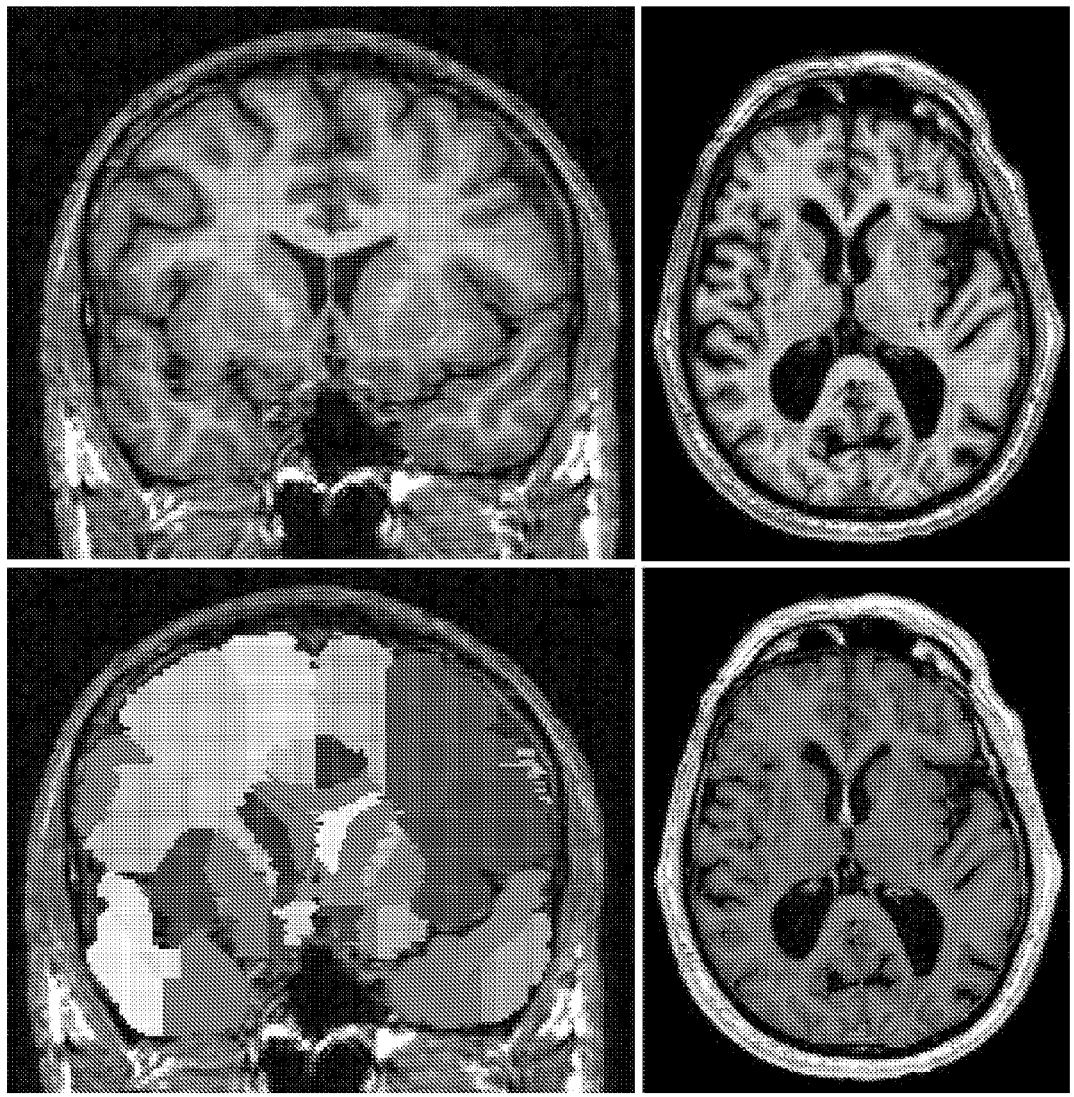
FIG. 3 illustrates an image from one of the data sets of FIG. 2.

The data used in this work, depicted in FIG. 2, comprises two sets: (i) 30 young controls with associated structural parcelation of 83 key structures [3] (http://www.brain-development.org); and (ii) 90 subjects from the ADNI database (http://adni.loni.ucla.edu), subdivided into 30 controls, 30 Mild Cognitive Impairment (MCI), and 30 Alzheimer's diseased (AD) patients with associated manual segmentations of the brain. FIG. 3 shows one dataset from the ADNI database together with the associated structure parcelation. In particular, top-left indicates an MRI image of a pathologically normal subject, while top-right indicates an MRI image of a subject with Alzheimer's disease. Bottom-left indicates a parcellation of the brain image from top-left into the composing substructures, while bottom-right indicates a brain mask (in effect, the area identified as brain) overlaid on the brain image from top-right.

The approach described herein helps to homogenise databases under the assumption that extra information is only available on a subset of the data. From these sources of extra information, measuring the information extrapolation accuracy is necessarily limited by the anatomical and pathological variability within the full dataset and by the range of available segmentations. Furthermore, the most complex sources of extra information, like the 30 young controls with full brain parcelations, are not available from pathological subjects—which makes the validation anecdotal for untested morphologies.

The validation described herein has two components. Firstly, the overlap accuracy of multi-label information propagation can be estimated and compared to MAPER [4] using a leave-one-out approach on the 30 young controls. Secondly, the information extrapolation accuracy can be characterised by propagating the brain segmentations from the elderly control group to the MCI and AD patients.

Multi-label propagation accuracy: the accuracy of propagating information through a geodesic path was compared to MAPER [4], a direct information fusion method based on majority voting. As the number of parcelations available for validation is limited, a leave-one-out cross-validation was performed only on the 30 young controls that have manual brain parcelations. It should be noted that the limited availability of segmentations restricts the range of morphological variability in the propagation, and hence is not fully representative of the performance when segmenting morphologically dissimilar subjects.

Figure 4:
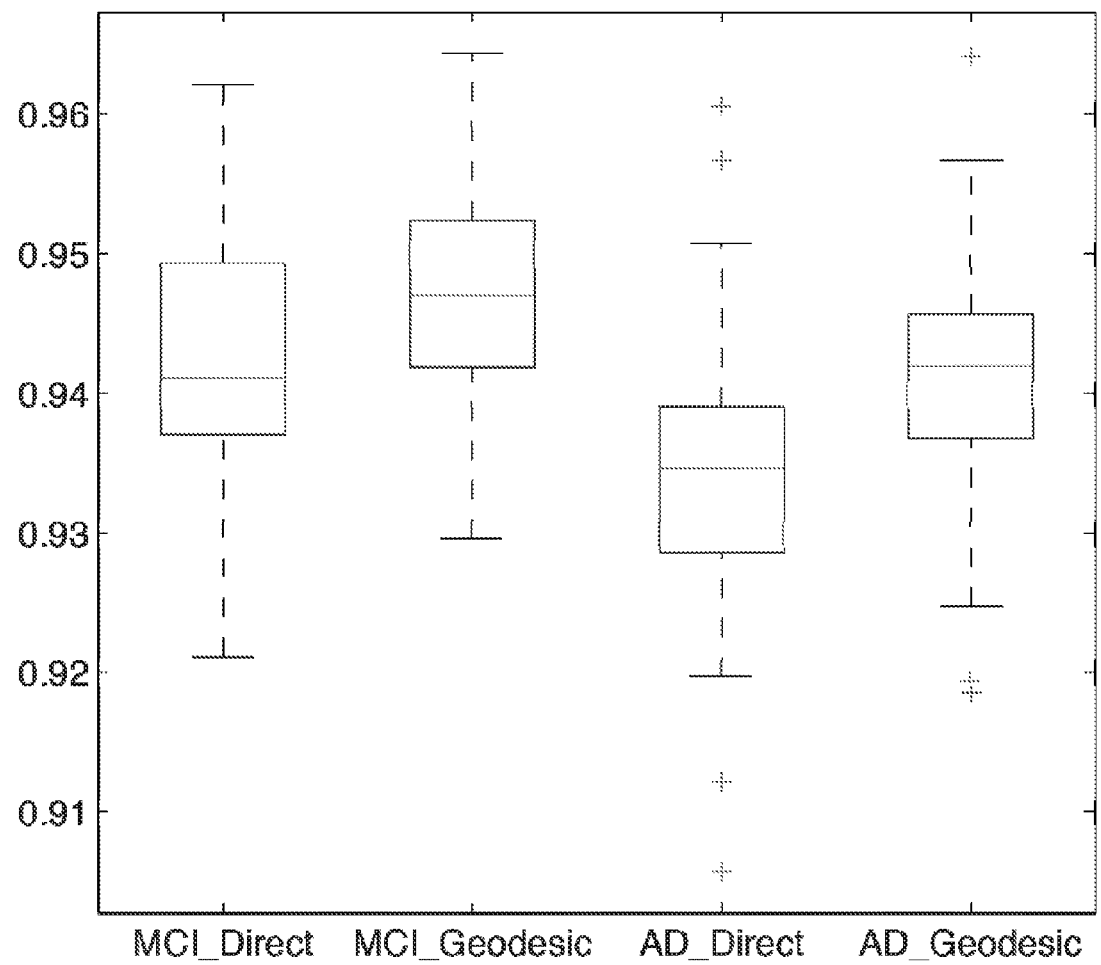
FIG. 4 is a graph depicting the performance of a geodesic information flow method in accordance with an embodiment of the invention, compared with the performance of a known technique.

The Dice score [13] was used as a measure of accuracy. The mean Dice scores per structure for leave-one-out cross validation are shown in FIG. 4 for both direct and geodesic propagation of a brain mask representing a segmentation of the brain, providing pixel-by-pixel localisation of the brain. Out of 83 structures, 15 structures had a significantly higher Dice score using the approach described herein (geodesic information flow/geodesic propagation) compared with MAPER, while only two structures (lingual gyrus and superior parietal gyrus) were better segmented in MAPER. The mean Dice score over all structures and all patients for the proposed method (0.8197) was significantly higher ($p<10^{-4}$) than in MAPER (0.8089). Further details of these results are presented in Table 1 below, which shows the mean Dice coefficient for a set of key structures, comparing the method described herein (geodesic information flow) with the MAPER technique [4]. (Note that Table 1 only includes a limited number of the structures by way of example).

TABLE 1

| Structure | Unilateral Structures | | |
|---|---|---|---|
|  | GIF | MAPER | p-value |
| All Structures | 0.8179 | 0.8089 | $<10^{-4}$ |
| Corp. callos. | 0.8802 | 0.8674 | $<10^{-4}$ |
| Brainstem | 0.9534 | 0.9377 | $<10^{-4}$ |

| | Left Side | | | Right Side | | |
|---|---|---|---|---|---|---|
| Structure | GIF | MAPER | p-value | GIF | MAPER | p-value |
| Hippocampus | 0.8439 | 0.8335 | 0.0048 | 0.8251 | 0.8211 | 0.2036 |
| Amygdala | 0.8263 | 0.7922 | $<10^{-4}$ | 0.8241 | 0.7830 | $<10^{-4}$ |
| Caudate nucl. | 0.8983 | 0.8923 | 0.0380 | 0.9004 | 0.8955 | 0.0478 |
| Nucleus acc. | 0.7581 | 0.6834 | $<10^{-4}$ | 0.7317 | 0.6707 | $<10^{-4}$ |
| Putamen | 0.9069 | 0.8916 | $<10^{-4}$ | 0.9107 | 0.8959 | $<10^{-4}$ |
| Thalamus | 0.9210 | 0.8879 | $<10^{-4}$ | 0.9205 | 0.8852 | $<10^{-4}$ |
| Pallidum | 0.8562 | 0.7661 | $<10^{-4}$ | 0.8554 | 0.7672 | $<10^{-4}$ |

Information Extrapolation Accuracy: in the previous subsection, the accuracy of propagating information through a geodesic path was limited to a morphologically similar set of subjects, and therefore such validation will not reflect the ability to extrapolate information to anatomically disparate subjects. The information extrapolation accuracy is thus assessed by using only a subset (the elderly control group) of all the manual brain segmentations, a morphologically clustered set of data, to segment both the MCI and AD groups. The approach described herein, using geodesic propagation, is compared to a direct propagation algorithm based on the locally weighted majority voting algorithm with an inverse exponential weight, as proposed by Yushkevich et al. [12]. The results are presented in FIG. 4, with segmentation accuracy again measured using Dice similarity. The mean (std) Dice score for the geodesic method described herein was 0.940(0.009) and 0.947(0.008) for the AD and MCI groups respectively, while for the direct propagation method, the mean (std) Dice score was 0.934 (0.009) and 0.942(0.008) for the AD and MCI groups respectively. This represents a statistically significant ($p<10^{-4}$) increase in segmentation accuracy according to a two-tailed paired t-test for statistical comparison. (Note that one should not compare these results with other brain segmentation methods due to the lack of post-processing and the limited size of the training set).

Figure 5:
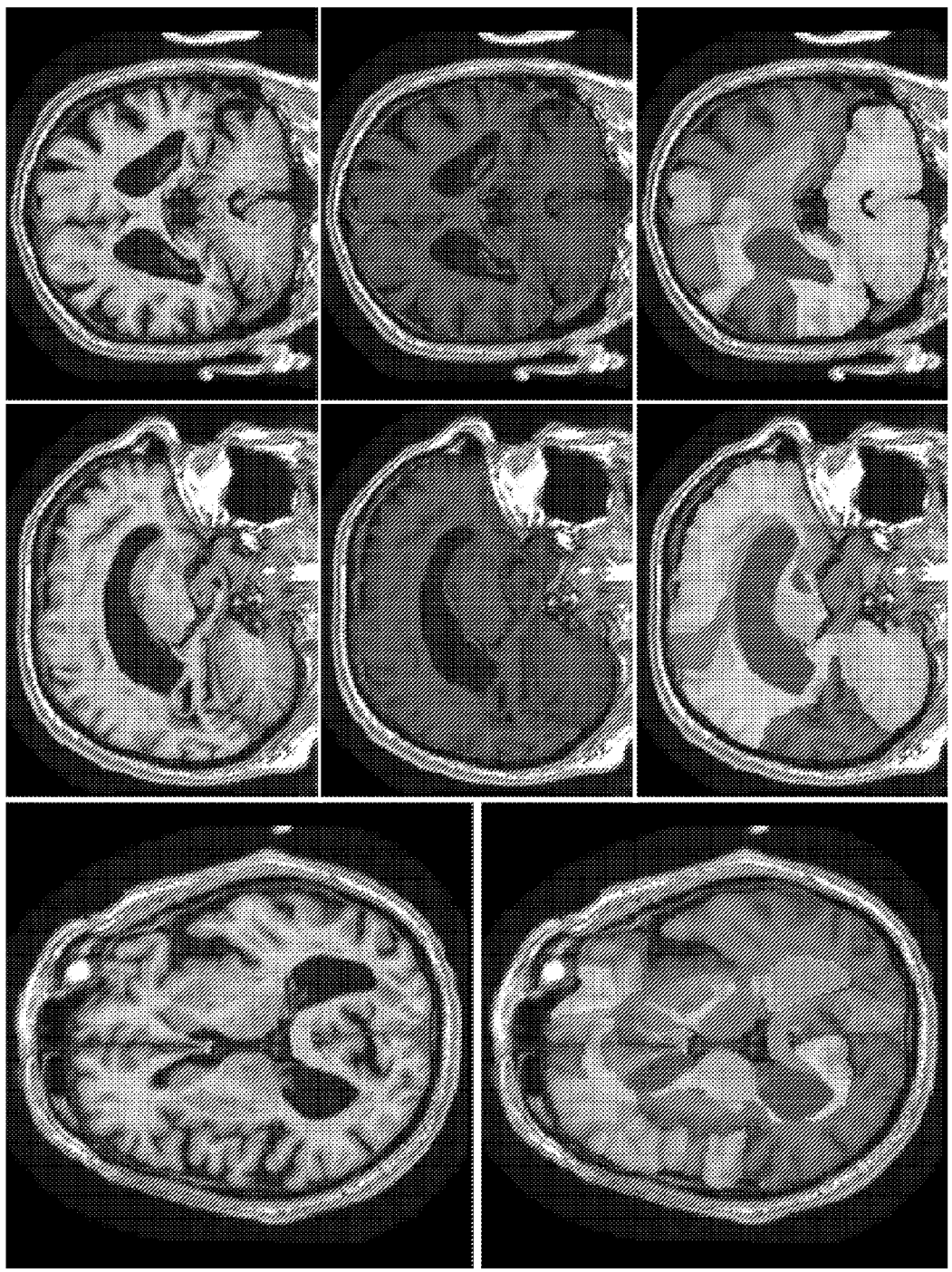
FIG. 5 illustrates an image and the resulting segmentation/parcelation obtained by a method in accordance with an embodiment of the invention.

FIG. 5 depicts an example of the propagation of both the structural parcelation and brain segmentation for a highly atrophied AD subject (ID:1281) from the ADNI database using the approach described herein. In particular, the top row of FIG. 5 depicts MRI images from different angles of an AD patient. The middle row of FIG. 5 shows a brain mask overlaid on the corresponding image from the top row to indicate the location of the brain (this image is omitted from the leftmost column). The bottom row of FIG. 5 shows the resulting parcelation into the brain's composing substructures for the corresponding image from the top row, obtained by the information propagation technique described herein. Note the correct ventricle segmentation and the smooth deep grey matter parcelation.

The image processing method described herein can be applied, for example, in the context of dementia, where there are major challenges in improving early diagnosis. Quantitative imaging biomarkers can play a transformative role in addressing these challenges. Traditional structural imaging is recommended in clinical guidelines, but quantitative MR imaging biomarkers help to add confidence to a diagnosis. However, only a minority of suspected dementia sufferers get a MR scan currently, and a tiny fraction get a quantitative analysis of the MR scan, which remains a labour-intensive task which is generally unavailable outside highly specialised centres. Adding automated quantitative MR imaging therefore offers the prospect of significantly transforming the value of imaging to speed up clinical decision-making, potentially reducing the number of repeat visits at memory clinics, and improving quality of life by getting appropriate patients onto symptomatic treatments earlier.

Such automated quantitative MR imaging involves the identification of combinations of imaging and non-imaging data (e.g. age, education, cognitive score, CSF sampling, APOE4 genotype) to provide enhanced prediction of progression, considering the multi-modal imaging signature of each specific disease while taking into account the potential uncertainty coming from the data. In particular, multi-modal data, including non-imaging information, from an individual patient can be compared to cohorts that are morphologically matched to the subject in question. This provides a means of normalisation of the extracted biomarkers and can be used to estimate the certainty/uncertainty of diagnosis.

The Geodesic Information Flow (GIF) framework described herein addresses the computational complexity challenges of existing techniques, using local morphology rather than global, and allows multiple sources of features to be combined. Data (e.g. segmentations and pathological classifications) is propagated between morphologically dissimilar images by diffusing and mapping the local information through intermediate steps. This framework recognises that comparing morphologically similar images is a relatively straightforward task, while doing the same for morphologically disparate subjects is much more prone to error [21]. The GIF framework utilises a graph structure to connect every location (pixel or voxel) in an image to the corresponding locations on the most locally similar images in a database [14]. Each image can thus be connected to a different set of subjects at each spatial position, as each location in the brain might belong to a different morphological subgroup (e.g. different sulcus patterns, sub-cortical shapes and volumes). In this framework, the existence of a graph connection at a certain location between a pair of images is dependent on a graph edge weight. This graph edge weight represents the degree of morphological and pathological proximity between two images, combining both clinical (e.g. age, education, cognitive score, APOE4) and local imaging features (e.g. intensity, signal correlation, mutual information, displacement maps, amyloid PET uptake).

Powerful classical tools for graph characterization can be directly applied to the GIF framework. Graph characteristics like the small-worldness of the graph, the network robustness, the graph density and the geodesic graph distances can provide insights about the degree of morphological clustering, the presence of spurious connections, the uncertainty due to missing data and the presence of outlier morphologies and outlier subjects. The GIF framework also allows for reinforcement learning, where the subject that is being tested can be added to the graph depending on the degree of uncertainty of the classification, resulting in an improvement in the overall accuracy of the classification and the morphological coverage of the graph.

Figure 6:
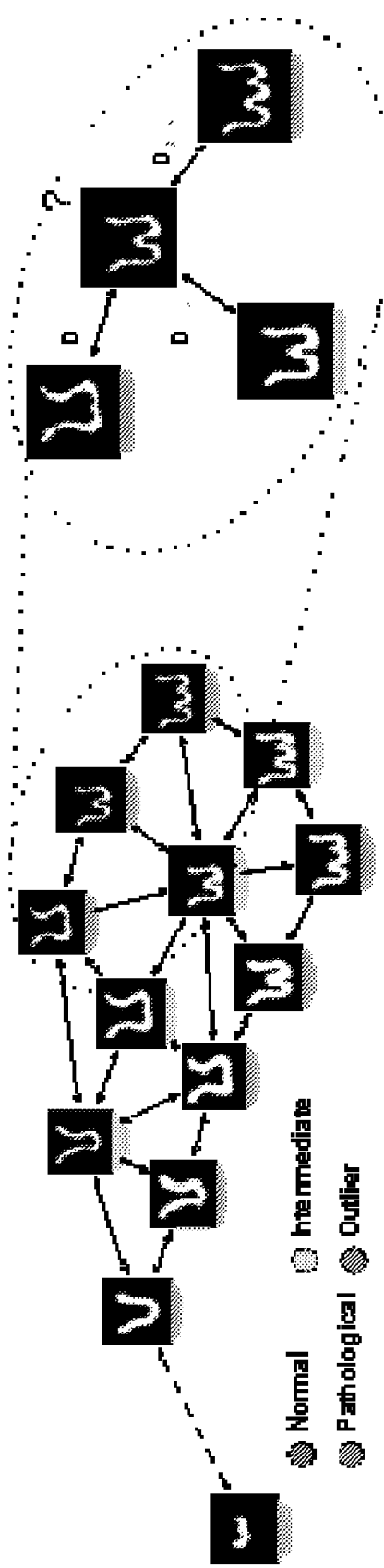
FIG. 6 illustrates an implicit manifold (left) and the connections between data points on the implicit manifold (right), as applied to differential diagnosis in dementia in accordance with one embodiment of the invention.

FIG. 6 illustrates the generalised Geodesic Information Flow (GIF) framework, analogous to FIG. 1, applied to differential diagnosis in dementia, in particular illustrating local sulcus variability in shape and cortical thickness. As shown in the right-hand portion of FIG. 6, each image in the database is locally connected to the most morphologically similar subjects through a graph structure. This graph structure can then be used to transfer information between pairs of images. As shown in the left-hand portion of FIG. 6, if the pathological status of an image is unknown, one is able to reconstruct that missing information by looking at its immediate graph neighbourhood and the similarity weights D.

Figure 7:
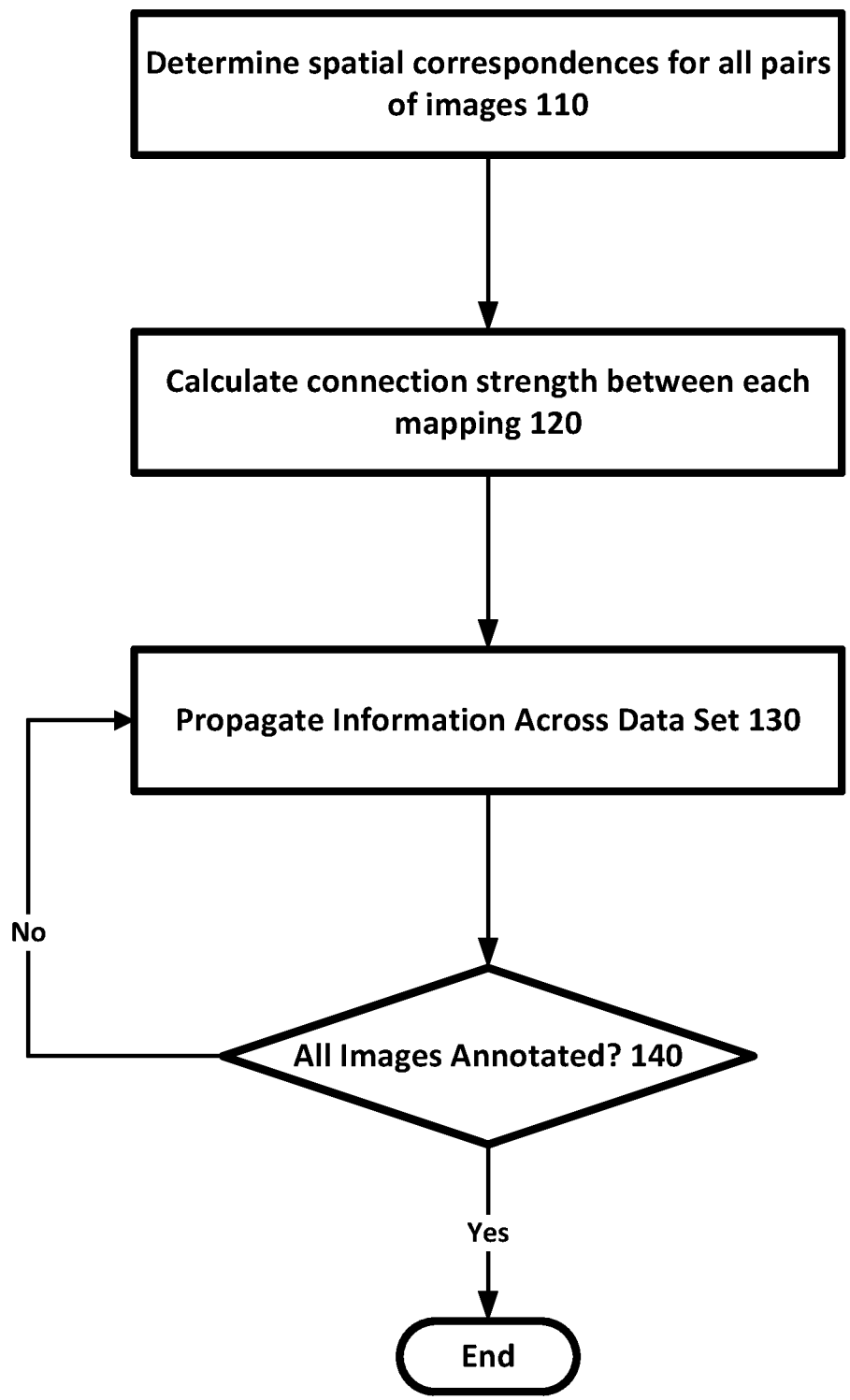
FIG. 7 is a flowchart illustrating a method for annotating images in accordance with one embodiment of the invention.

FIG. 7 is a flowchart illustrating a method for propagating information in accordance with an embodiment of the invention. The method commences with determining spatial correspondences for all pairs of images in the data set, wherein each spatial correspondence represents a mapping of a location in a first image to a corresponding location in a second image (110). In other words, a transformation is found that minimises a cost function with respect to a local area of one image mapping to a local area of another image. This transformation may be based (at least in part) on the morphology of the object being imaged, and provides a form of (local) registration between the two images concerned.

Next, for each pairwise mapping of locations, a connection strength is calculated between the location in the first image and the corresponding location in the second (transformed) image (120). This connection strength is based on a distance metric (pairwise similarity) with respect to the corresponding image locations and generally takes into consideration both local morphology and local image similarity. The relative importance or contribution of these two factors can be adjusted as appropriate. In addition, the pairwise similarity can also reflect metadata available for the images—i.e. the pairwise similarity may be enhanced if metadata indicates some commonality between the two images. For example, the metadata may indicate that two images are of the same subject, relate to subjects of a similar age, similar build and/or the same gender, relate to similar pathology, were obtained using a similar imaging modality, relate to a similar pose, and so on. It will be appreciated that the metadata parameters (if any) utilised for determining similarity may depend on the parameter(s) available for the images concerned, the particular type of images, and so on.

Having determined the connection strengths between locations, information is iteratively propagated across images in the data set using the connection strengths of the mappings as weights for propagating the information (130). The propagated information is used to provide annotations to images which do not initially have annotations. In determining the propagations, the connection strengths may be augmented by an estimate of propagation accuracy. This estimate may be relatively simple, for example, based on whether or not the propagation is from an image which was originally annotated compared with an image which has been subsequently annotated by the propagating information. In other implementations, a more sophisticated estimate may be made of the propagation estimate—for example, the propagation accuracy estimated for an image location may decrease as more iterations are required to annotate that image location.

Note that each iteration involves determining information propagation across the entire data set. For example, assume that there are images A-Z, and A-F are initially annotated. The first iteration may lead to the additional annotation of images G-L, based on information propagated from images A-F. In the second iteration, information is propagated from images A-L. This leads (say) to images M-V being newly annotated. In addition, images G-L are re-annotated—with potentially different values from the first iteration; this is because image L (for example), now receives propagated information from images A-K, rather than from A-F as in the first iteration. After each iteration, a test is performed (140) to determine whether to perform a further iteration. In the present example, since images W-Z remain to be annotated, a third iteration is performed. Assuming that this propagates information to images W-Z (as well as re-annotating images G-V), then the processing can terminate, with all images now annotated.

Accordingly, the approach described herein provides a method in which information is geodesically propagated through a local implicit neighbourhood graph. The application of the method (by way of example) to structural parcelation and brain segmentation propagation has demonstrated significant advantages when compared to existing methods.

Various embodiments of the invention have been described above. The skilled person will appreciated that the features of these embodiments may be combined with one another as appropriate, or modified according to the particular circumstances of any given application. The scope of the invention is defined by the appended claims and their equivalents.

REFERENCES

1. Rohlfing, T., Russakoff, D. B., Maurer, C. R.: Performance-based classifier combination in atlas-based image segmentation using expectation-maximization parameter estimation. IEEE TMI 23(8) (August 2004) 983-994
2. Aljabar, P., Heckemann, R. A., Hammers, A., Hajnal, J. V., Rueckert, D.: Multi-atlas based segmentation of brain images: atlas selection and its effect on accuracy. NeuroImage 46(3) (July 2009) 726-738
3. Hammers, A., Chen, C., Lemieux, L.: Statistical neuroanatomy of the human inferior frontal gyrus and probabilistic atlas in a stereotaxic space. HBM (2007)
4. Heckemann, R. A., Keihaninejad, S., Aljabar, P.: Improving intersubject image registration using tissue-class information benefits robustness and accuracy of multi-atlas based anatomical segmentation. NeuroImage (2010)
5. Cardoso, M. J., Modat, M., Keihaninejad, S., Cash, D., Ourselin, S.: Multi-STEPS: Multi-label Similarity and Truth Estimation for Propagated Segmentations. MM-BIA (January 2012) 153-158
6. Wolz, R., Aljabar, P., Hajnal, J. V., Hammers, A., Rueckert, D., Alzheimer's Disease Neuroimaging Initiative: LEAP: learning embeddings for atlas propagation. NeuroImage 49(2) (January 2010) 1316-1325
7. Hamm, J., Ye, D. H., Verma, R., Davatzikos, C.: GRAM: A framework for geodesic registration on anatomical manifolds. MedIA 14(5) (October 2010) 633-642
8. Gerber, S., Tasdizen, T., Joshi, S., Whitaker, R.: On the manifold structure of the space of brain images. Medical Image Computing and Computer-Assisted Intervention 12 (2009) 305-312
9. Kondor, R. I., Lafferty, J.: Diffusion kernels on graphs and other discrete input spaces. ICML (January 2002)
10. Marc Modat, Manuel Jorge Cardoso, Pankaj Daga, David M. Cash, Nick C. Fox, Sébastien Ourselin, Inverse-Consistent Symmetric Free Form Deformation. 79-88, WBIR 2012
11. Souvenir, R., Pless, R.: Image distance functions for manifold learning. Image and Vision Computing 25(3) (March 2007) 365-373
12. Yushkevich, P. A., Wang, H., Pluta, J., Das, S. R., Craige, C., Avants, B. B., Weiner, M. W., Mueller, S.: Nearly automatic segmentation of hippocampal subfields in in vivo focal T2-weighted MRI. NeuroImage 53(4) (December 2010) 1208-1224
13. Dice, L.: Measures of the amount of ecologic association between species. Ecology 26(3) (1945) 297-302
14. Cardoso, 2012 MICCAI
16. Ashburner et al., 1999 HBM
17. Ashburner et al., 2000 NeuroImage
18 Kloppel et al., 2008 Brain
19. Barnes et al., 2004 Neuroimage
20. Ferrarini et al., 2009 Journal of Alzheimer's Disease
21. Baloch et al., 2009 Neuroimage
22. Hamm et al., 2010 Medical Image Analysis
23. Cuingnet et al., 2011 Neuroimage
24. Heckemann et al., 2006 Neuroimage
25. Artaechevarria et al., 2009 IEEE TMI
26. Coupé et al., 2012 Neuroimage

The invention claimed is:

1. A computer-implemented method of annotating images in a data set comprising a first set of images which initially have annotations and a second set of images which initially do not have annotations, the method comprising:
determining spatial correspondences for all pairs of images in the data set, wherein each spatial correspondence represents a mapping of a location in a first image to a corresponding location in a second image, including determining a first mapping of a first location in the first image to a first location in the second image and a second mapping of a second location in the first image to a second location in the second image, wherein the first location in the first image is different from the second location in the first image, and the first location in the second image is different from the second location in the second image;
for each mapping, calculating a connection strength between the location in the first image and the corresponding location in the second image, wherein the connection strength is determined using a pairwise measure of similarity between one or more features in a pair of images that is calculated locally on a restricted portion of the pair of images, such that the connection strength is spatially variant across a pair of images, including calculating a first connection strength for said first mapping and a second connection strength for the second mapping, wherein the first connection strength for the first mapping is different from the second connection strength for the second mapping; and
iteratively propagating information across images in the data set using: (i) the connection strengths of the mappings, including the first and second connection strengths of the first and second mappings respectively, and (ii) an estimate of the accuracy of the information which is being propagated, as weights for propagating the information, wherein the propagated information is used to provide annotations to images which do not initially have annotations, and wherein each iteration performs a propagation across all images in the data set.

2. The method of claim 1, wherein the pairwise measure of similarity is based on intensity similarity between the images.

3. The method of claim 1, wherein the pairwise measure of similarity is based on a characteristic of deformation between a pair of images.

4. The method of claim 1, wherein the pairwise measure of similarity is based on clinical metadata, including age, gender, pathological status, cognitive or biological testing.

5. The method of claim 1, wherein a pair of images represents different properties of the same object.

6. The method of claim 1, wherein the propagation step is performed by weighted averaging, classifier fusion or kernel regression.

7. The method of claim 1, wherein the step of propagating the information comprises propagating labels, intensities, probabilities, pathological status, statistics, vectors, displacement fields or a combination of these.

8. The method of claim 1, wherein the connection strength and/or the information propagation step is augmented by an intensity-based refinement operation.

9. The method of claim 1, wherein the estimate of propagation accuracy is based on the number of iterations before an image is annotated.

10. The method of claim 1, wherein the estimate of propagation accuracy is based on a normalized weighted sum of information available at directly neighboring locations.

11. The method of claim 10, wherein the weighted sum involves weightings that are based on a geodesic distance, such that images in the second set which are closer to images in the first set are regarded as having a higher accuracy.

12. The method of claim 11, wherein the geodesic distance represents the distance between a given position in an image in the second set and the closest source of information for that position in a separate image from the first set.

13. The method of claim 11, wherein the weighting is based on the sum of (i) the smallest value of a neighbor's geodesic distance, and (ii) the pairwise distance for all neighboring nodes.

14. The method of claim 1, wherein the images are of different subjects, different pathologies, different time-points of the same subject, or any combination of these.

15. The method of claim 1, wherein the images are magnetic resonance images.

16. A non-transitory computer-readable storage medium storing instructions that when executed by a computer cause the computer to perform a method for annotating images in a data set comprising a first set of images which initially have annotations and a second set of images which initially do not have annotations, the method comprising:
  determining spatial correspondences for all pairs of images in the data set, wherein each spatial correspondence represents a mapping of a location in a first image to a corresponding location in a second image, including determining a first mapping of a first location in the first image to a first location in the second image and a second mapping of a second location in the first image to a second location in the second image, wherein the first location in the first image is different from the second location in the first image, and the first location in the second image is different from the second location in the second image;
  for each mapping, calculating a connection strength between the location in the first image and the corresponding location in the second image, wherein the connection strength is determined using a pairwise measure of similarity between one or more features in a pair of images that is calculated locally on a restricted portion of the pair of images, such that the connection strength is spatially variant across a pair of images, including calculating a first connection strength for said first mapping and a second connection strength for the second mapping, wherein the first connection strength for the first mapping is different from the second connection strength for the second mapping; and
  iteratively propagating information across images in the data set using: (i) the connection strengths of the mappings, including the first and second connection strengths of the first and second mappings respectively, and (ii) an estimate of the accuracy of the information which is being propagated, as weights for propagating the information, augmented by an estimate of propagation accuracy, wherein the propagated information is used to provide annotations to images which do not initially have annotations, and wherein each iteration performs a propagation across all images in the data set.

17. An apparatus that annotates images in a data set comprising a first set of images which initially have annotations and a second set of images which initially do not have annotations, wherein during operation, the apparatus:
  determines spatial correspondences for all pairs of images in the data set, wherein each spatial correspondence represents a mapping of a location in a first image to a corresponding location in a second image, and determines a first mapping of a first location in the first image to a first location in the second image and a second mapping of a second location in the first image to a second location in the second image, wherein the first location in the first image is different from the second location in the first image, and the first location in the second image is different from the second location in the second image;
  for each mapping, calculates a connection strength between the location in the first image and the corresponding location in the second image, wherein the connection strength is determined using a pairwise measure of similarity between one or more features in a pair of images that is calculated locally on a restricted portion of the pair of images, such that the connection strength is spatially variant across a pair of images, and calculates a first connection strength for said first mapping and a second connection strength for the second mapping, wherein the first connection strength for the first mapping is different from the second connection strength for the second mapping; and
  iteratively propagates information across images in the data set using: (i) the connection strengths of the mappings, including the first and second connection strengths of the first and second mappings respectively, and (ii) an estimate of the accuracy of the information which is being propagated, as weights for propagating the information, augmented by an estimate of propagation accuracy, wherein the propagated information is used to provide annotations to images which do not initially have annotations, and wherein each iteration performs a propagation across all images in the data set.

18. The apparatus of claim 17, wherein said apparatus comprises a medical scanner.

19. A computer-implemented method of annotating images in a data set comprising a first set of images which initially have annotations and a second set of images which initially do not have annotations, the method comprising:
  determining spatial correspondences for all pairs of images in the data set, wherein each spatial correspondence represents a mapping of a location in a first image to a corresponding location in a second image;
  for each mapping, calculating a connection strength between the location in the first image and the corresponding location in the second image; and
  iteratively propagating information across images in the data set using the connection strengths of the mappings as weights for propagating the information, augmented by an estimate of propagation accuracy, wherein the propagated information is used to provide annotations to images which do not initially have annotations, and wherein each iteration performs a propagation across all images in the data set;
  wherein the estimate of propagation accuracy is based on the number of iterations before an image is annotated.

20. A computer-implemented method of annotating images in a data set comprising a first set of images which initially have annotations and a second set of images which initially do not have annotations, the method comprising:

determining spatial correspondences for all pairs of images in the data set, wherein each spatial correspondence represents a mapping of a location in a first image to a corresponding location in a second image;

for each mapping, calculating a connection strength between the location in the first image and the corresponding location in the second image; and iteratively propagating information across images in the data set using the connection strengths of the mappings as weights for propagating the information, augmented by an estimate of propagation accuracy, wherein the propagated information is used to provide annotations to images which do not initially have annotations, and wherein each iteration performs a propagation across all images in the data set;

wherein the estimate of propagation accuracy is based on a normalizes weighted sum of information available at directly neighboring locations, wherein the weighted sum involves weightings that are based on a geodesic distance, such that images in the second set which are closer to images in the first set are regarded as having a higher accuracy, and wherein the weighting is based on the sum of (i) the smallest value of a neighbor's geodesic distance, and (ii) the pairwise distance for all neighboring nodes.

21. The method of claim 20, wherein the geodesic distance represents the distance between a given position in an image in the second set and the closest source of information for that position in a separate image from the first set.

\* \* \* \* \*